United States Patent
Zeng

(10) Patent No.: US 9,860,415 B2
(45) Date of Patent: Jan. 2, 2018

(54) METHOD AND DEVICE FOR PICTURE-BASED BARCODE ENCODING AND DECODING

(71) Applicant: INSTITUTE FOR INFORMATION INDUSTRY, Taipei (TW)

(72) Inventor: Yi-Chong Zeng, Keelung (TW)

(73) Assignee: INSTITUTE FOR INFORMATION INDUSTRY, Taipei (TW)

(*) Notice: Subject to any disclaimer, the term of this patent is extended or adjusted under 35 U.S.C. 154(b) by 158 days.

(21) Appl. No.: 14/945,394

(22) Filed: Nov. 18, 2015

(65) Prior Publication Data

US 2017/0076416 A1 Mar. 16, 2017

(30) Foreign Application Priority Data

Sep. 16, 2015 (TW) .............................. 104130634 A

(51) Int. Cl.
*G06T 1/00* (2006.01)
*H04N 1/32* (2006.01)
*G06K 19/06* (2006.01)

(52) U.S. Cl.
CPC ... *H04N 1/32277* (2013.01); *G06K 19/06046* (2013.01); *G06T 1/0035* (2013.01); *G06T 2201/0053* (2013.01); *H04N 2201/3236* (2013.01); *H04N 2201/3269* (2013.01); *H04N 2201/3284* (2013.01)

(58) Field of Classification Search
CPC ... G06T 1/0021; G06T 1/0028; G06T 1/0035; G06T 1/0092; G06T 2201/0051; G06T 2201/0061; H04N 1/32208; H04N 1/32251; H04N 1/32267; H04N 2201/3269;
(Continued)

(56) References Cited

U.S. PATENT DOCUMENTS 5,243,655 A 9/1993 Wang .............................. 380/51
5,726,435 A 3/1998 Hara et al. .................... 235/294
(Continued)

FOREIGN PATENT DOCUMENTS

TW 451590 B 8/2001
TW 200823795 A 6/2008

OTHER PUBLICATIONS

Xiang Zhou, et al., A Semi-Fragile Watermark Scheme for Image Authentication, Proceedings of 10th International Multimedia Modelling Conference, 374-377, Jan. 5-7, 2004.
(Continued)

*Primary Examiner* — Andrew W Johns
(74) *Attorney, Agent, or Firm* — CKC & Partners Co., Ltd.

(57) ABSTRACT

A method for picture-based barcode encoding and decoding is provided herein. The method for picture-based barcode encoding includes: transforming an original data into an original data bitstream; performing an error correction on the original data bitstream for translating the original data bitstream into an error corrected bitstream; selecting all or part of the picture as an encoded area; calculating a data storage capacity of the encoded area; adjusting a size of the error corrected bitstream or a size of the encoded area for equalizing a data storage capacity of an encoded data bitstream and the data storage capacity of the encoded area; and adjusting a pixel value of the encoded area according to the encoded data bitstream.

12 Claims, 9 Drawing Sheets

(58) Field of Classification Search
CPC ..... H04N 2201/327; H04N 2201/3284; G06K 19/06075
See application file for complete search history.

(56) References Cited

U.S. PATENT DOCUMENTS

| | | | |
|---|---|---|---|
| 6,724,913 B1* | 4/2004 | Chen et al. | 382/100 |
| 7,936,901 B2 | 5/2011 | Janeke | 382/100 |
| 2002/0191812 A1* | 12/2002 | Kim | 382/100 |
| 2004/0120544 A1* | 6/2004 | Eguchi et al. | 382/100 |
| 2005/0039020 A1* | 2/2005 | Levy | 713/176 |
| 2015/0199600 A1 | 7/2015 | Wu et al. | |

OTHER PUBLICATIONS

The office action of the corresponding Taiwan application dated Jul. 18, 2016.
he search report of the corresponding European application issued on Jul. 27, 2017.

\* cited by examiner

METHOD AND DEVICE FOR PICTURE-BASED BARCODE ENCODING AND DECODING

RELATED APPLICATIONS

This application claims priority to Taiwan Application Serial Number 104130634, filed Sep. 16, 2015, which is herein incorporated by reference.

BACKGROUND

Field of Invention

The present invention relates to barcode encoding and decoding. More particularly, the present invention relates to picture-based barcode encoding and decoding.

Description of Related Art

Conventional image recognition technique receives information of pictures by calculating the image features and comparing with reference image features. Image recognition method needs a large quantity of reference images and causes heavy calculation. On the other side, application software may reduce recognition process by cloud computing. However, the recognition process is interrupted as the network is disconnected. Furthermore, the property of image features will affect the accuracy of image recognition.

Two-dimensional (2-D) barcode is a technique of picture-based data storage which accesses data without network connection. However, when 2-D barcode combines with picture, it covers the picture and breaks the integrity of the original picture. Moreover, there is a need for additional space to put 2-D barcode.

On the other hand, although existing 2-D barcode has larger data storage capacity than one-dimensional (1-D) barcode does, there is a need to solve the positioning issue and to enhance the error-correcting ability. Moreover, existing 2-D barcode is only for communicating information, and it is difficult to combine with merchandise.

Therefore, it is very important in this area to design a method and a device for barcode encoding and decoding which can be embedded in a picture and has enhanced error-correcting ability.

SUMMARY

In one aspect, the invention present disclosure is related to a method for picture-based barcode encoding including the following steps: transforming an original data into an original data bitstream; performing an error correction on the original data bitstream for translating the original data bitstream into an error corrected bitstream; selecting all or part of the picture as an encoded area; calculating the data storage capacity of the encoded area; adjusting a size of the error corrected bitstream or a size of the encoded area for equalizing a size of an encoded data bitstream and the data storage capacity of the encoded area; and adjusting a pixel value of the encoded area according to the encoded data bitstream.

In another aspect, the invention present disclosure is related to a method for picture-based barcode decoding including the following steps: capturing all or part of a picture as a captured image; normalizing the captured image for generating a transformed image; calculating a mean color value of a plurality of blocks of the transformed image for generating a decoded data; performing an inverse error correction on the decoded data for generating an original data bitstream; transforming the original data bitstream into an original data; and outputting the original data with an output device.

In still another aspect, the invention present disclosure is related to a device for picture-based barcode encoding. The device includes a memory and a processor. The memory is configured to store an original data, an original data bitstream, an error corrected bitstream, a storage data of an encoded area, an encoded data bitstream and a picture. The processor is configured to execute the following steps: transforming the original data into the original data bitstream; performing an error correction on the original data bitstream for translating the original data bitstream into the error corrected bitstream; selecting all or part of the picture as an encoded area; calculating the data storage capacity of the encoded area; adjusting a size of the error corrected bitstream or a size of the encoded area for equalizing a size of an encoded data bitstream and the data storage capacity of the encoded area; and adjusting a pixel value of the encoded area according to the encoded data bitstream.

Yet another aspect, the invention present disclosure is related to a device for picture-based barcode decoding. The device comprises a memory, an image capturing device and a processor. The memory is configured to store a captured image, a transformed image, a decoded data, an original data bitstream, and an original data. The image capturing device is for capturing all or part of a picture as the captured image. The processor is electrically connected to the image capturing device and the memory for executing the following steps: calculating a mean color value of a plurality of blocks of the transformed image for generating a decoded data; performing an inverse error correction on the decoded data for generating the original data bitstream; transforming the original data bitstream into the original data; and outputting the original data with an output device.

According to the technique of the present disclosure, data may be stored in picture without extra space for placing barcode. Therefore, users may access data stored in the picture by scanning the picture with a mobile device, but not receives information of pictures through the internet. In addition, error correction capability and storage capacity of barcode are efficiently enhanced.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
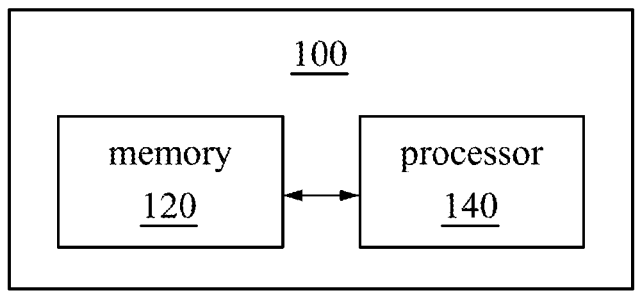
FIG. 1 is a block diagram of a device for picture-based barcode encoding according to an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram of a device for picture-based barcode encoding 100 according to an embodiment of the present disclosure. The device 100 includes a memory 120 and a processor 140. The memory 120 includes a log manager, a log buffer, or a log repository for storing a variety of data of the device 100.

In an embodiment, the memory 120 is for storing data, such as original data, original data bitstream, error corrected bitstream, data of encoded area, encoded data bitstream, and pictures for encoding.

Processor 140 may be implemented with an independent microprocessor or one or more CPUs. In an embodiment, the memory 120 includes a program executed by the processor 140 in which the program causes the device 100 to encode when executed by the processor 140. Detailed description of the device 100 for picture-based barcode encoding is discussed in detail below.

Figure 2:
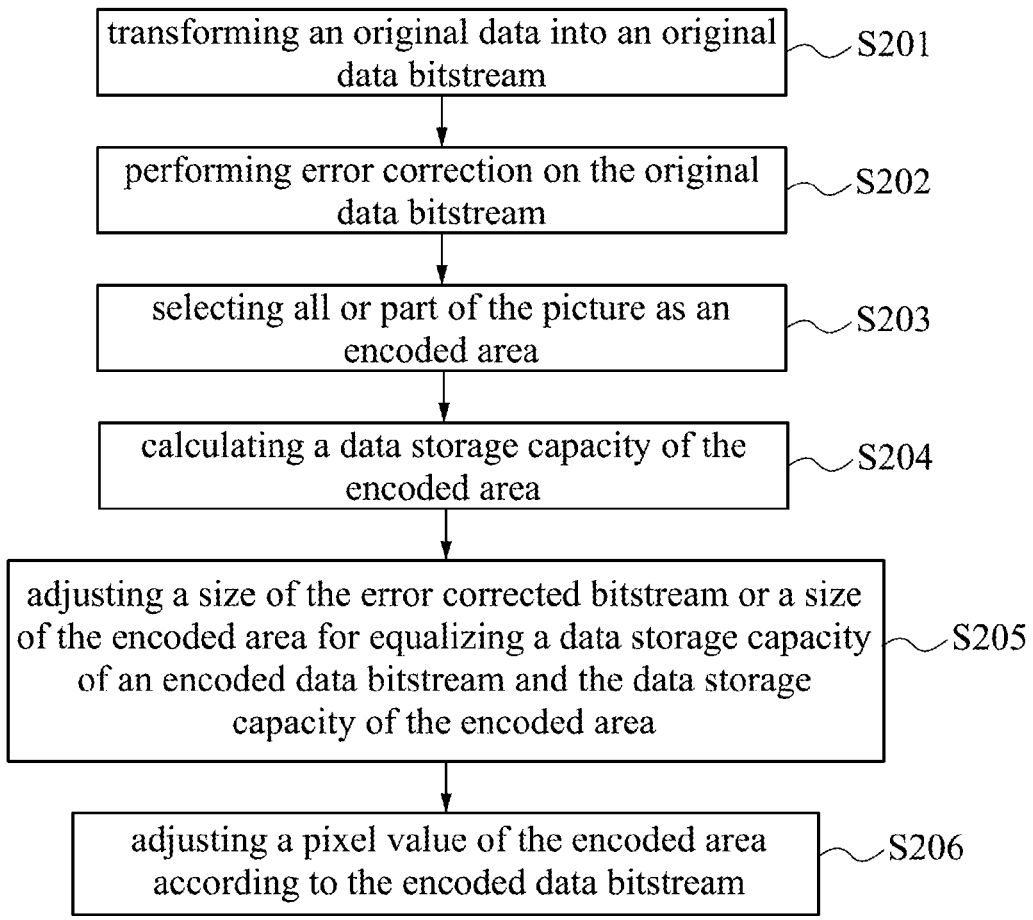
FIG. 2 is a flow chart of a method for picture-based barcode encoding according to an embodiment of the present disclosure.

Reference is made to FIG. 2. FIG. 2 is a flow chart of a method for picture-based barcode encoding according to an embodiment of the present disclosure. The method for picture-based barcode encoding may be implemented by the device 100, but is not limited in this regard. For convenience and clarity, it is assumed that the method for picture-based barcode encoding is implemented by the device 100 illustrated in FIG. 1.

In step S201, the processor 140 transforms an original data stored in the memory 120 into an original data bitstream. In an embodiment, the original data is text, image, voice or a combination thereof, but the disclosure is not limited thereto. In various embodiments, the original data may be different kinds of format. In this embodiment, the original data contains ASCII characters and the original data bitstream is a sequence of binary code.

In step S202, the processor 140 performs an error correction on the original data bitstream for translating the original data bitstream into an error corrected bitstream.

In an embodiment, the processor 140 divides every m-bit of the original data bitstream into a plurality of original data sub-bitstreams in which the original data bitstream has a length of L. In this embodiment, the original data sub-bitstream has a length of m and therefore generates $2^m$ combinations. According to some algorithms of error correction, the m-bit original data sub-bitstream may translate into n-bit error correcting code, in which m and n are positive integers and n is greater than m.

Figure 3:
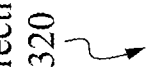
FIG. 3 is a diagram depicting a process for error correction according to an embodiment of the present disclosure.
Figure 3:
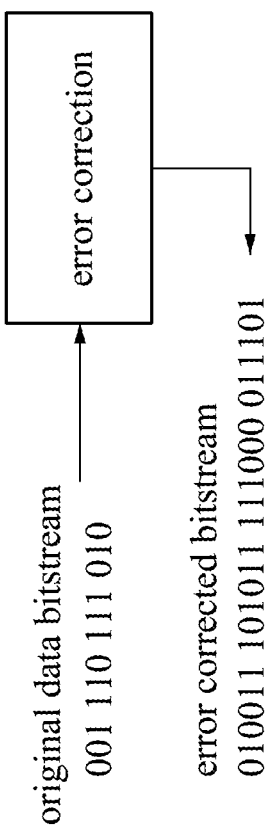

For convenience and clarity, reference is made to FIG. 3. FIG. 3 is a diagram depicting a process for error correction according to an embodiment of the present disclosure. In this embodiment, m and n respectively represent the data length of the original data sub-bitstream and the data length of the error correcting code, in which m is 3 and n is 6. Accordingly, as shown in error correction table 320, the original data sub-bitstream is translated into the error correcting code which has error correction ability. For example, if the original data sub-bitstream is 110, the corresponding error correcting code is 101011. Lastly, after the processor 140 performs error correction on all of the original data sub-bitstream, the combination of the corresponding error correcting codes is an error corrected bitstream.

In an embodiment, the data length of the original data bitstream is L, the data length of the error corrected bitstream is L', the data length of the original data sub-bitstream is m, and the data length of the error correcting code is n. The data length L' of the error corrected bitstream is expressed by the following equation:

$$L'=\lceil L/m \rceil \times n \qquad (1)$$

According to error correction, the error corrected bitstream may transform into the original data bitstream even if the error corrected bitstream is destroyed. However, the invention is not limited to the foregoing embodiments, the original data bitstream may divide into the original data sub-bitstream with more or less bit number.

Figure 4A:
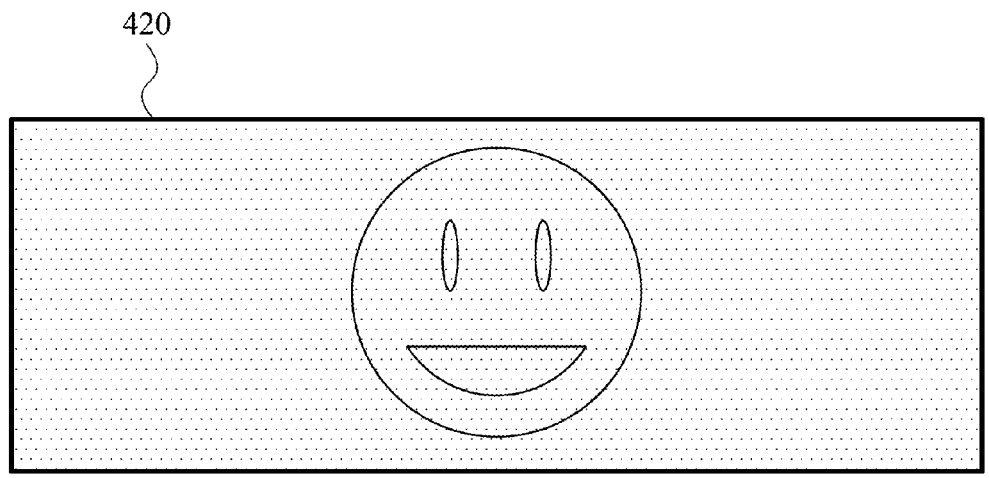
FIG. 4A is a diagram depicting an encoding area according to an embodiment of the present disclosure.
Figure 4B:
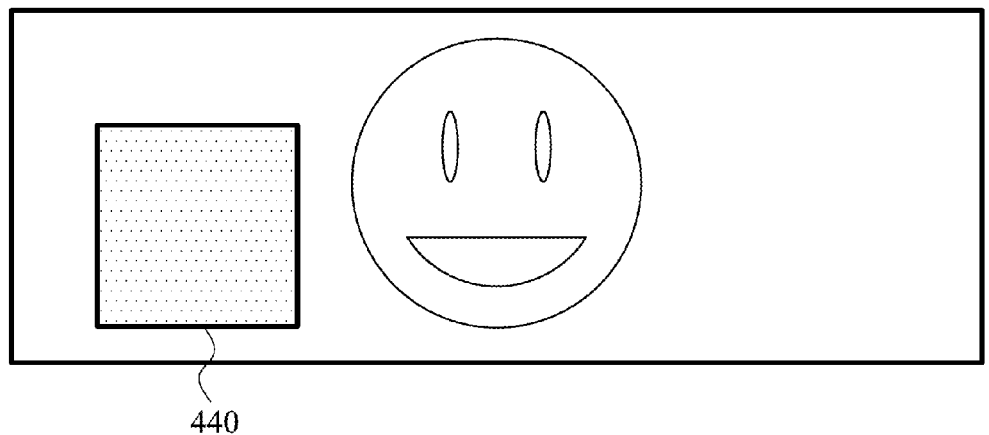
FIG. 4B is a diagram depicting another encoding area according to an embodiment of the present disclosure.

In step S203, the processor 140 enlarges the length and the width of the whole picture for 2S times, in which S is a positive integer and is greater than or equal to 1. In this embodiment, the length and the width of the picture are enlarged 2 times, which means S equals to 1. The processor 140 then selects all or part of the picture as an encoding area. For convenience and clarity, reference is made to FIGS. 4A and 4B. FIG. 4A is a diagram depicting an encoding area according to an embodiment of the present disclosure and FIG. 4B is a diagram depicting another encoding area according to an embodiment of the present disclosure. In various embodiments, the encoding area is rectangular or irregular shape. In one embodiment, as shown in FIG. 4A, the whole picture is encoded area 420. In this embodiment, the whole picture is the encoded area 420, and therefore the data storage capacity of the picture-based barcode is increased, and the problem of insufficient data storage capacity of conventional encoding method is solved. In another embodiment, as shown in FIG. 4B, only part of the picture is encoded area 440.

In step S204, the processor 140 calculates the data storage capacity of the encoded area. For example, W and H respectively represent the width and the height of a rectangular encoded area, in which W and H are greater than zero, and the data storage capacity K of the rectangular encoded area is expressed by the following equation:

$$K=\lfloor W/2 \rfloor \times \lfloor H/2 \rfloor \qquad (2)$$

In step S205, the processor 140 adjusts the size of the error corrected bitstream or the size of the encoded area for equalizing the data storage capacities of the encoded data bitstream and the encoded area. In an embodiment, the data storage capacity K of the encoded area is less than the size L' of the error corrected bitstream, and therefore the processor 140 re-chooses the encoded area or enlarges the number of pixels of the whole picture for equalizing the data storage capacity K of the encoded area and the size L' of the error corrected bitstream. In this embodiment, encoded data bitstream is the error corrected bitstream. In another embodiment, the data storage capacity K of the encoded area is greater than the size L' of the error corrected bitstream, and therefore the processor 140 performs zero-padding on the error corrected bitstream by adding (K−L') zeros, so as to enlarge the size of the error corrected bitstream for generating the encoded data bitstream which has data length K.

According to the step of adjusting the data length of the error corrected bitstream and the size of the encoded area, the size of the encoded data bitstream and the data storage capacity of the encoded area are the same.

Figure 5:
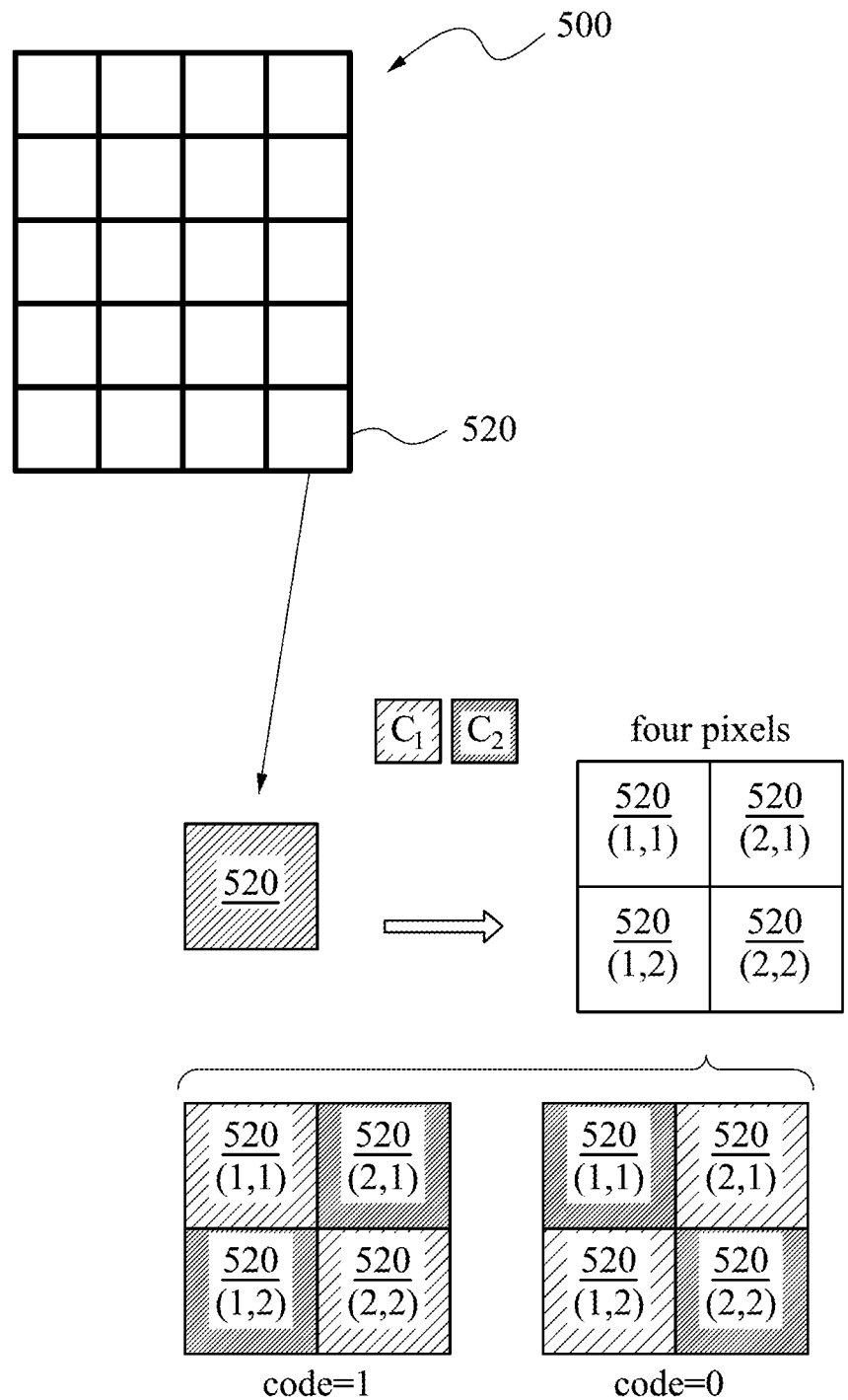
FIG. 5 is a diagram depicting a process for adjusting pixel values of an encoding area according to an embodiment of the present disclosure.

In step S206, the processor 104 adjusts pixel value of the encoded area according to the encoded data bitstream. For convenience and clarity, reference is made to FIG. 5. FIG. 5 is a diagram depicting a process for adjusting pixel values of an encoding area according to an embodiment of the present disclosure. As shown in FIG. 5, encoded area 500 includes a plurality of blocks 520.

Firstly, the processor 140 divides the block 520 into four pixels 520(1,1), 520(1,2), 520(2,1), and 520 (2,2). In various embodiments, the pixel values may be the same or different. In addition, the encoded area may be coloured, black and white, monochrome, or gray-level.

In an embodiment, the pixels 520(1,1), 520(1,2), 520(2, 1), and 520 (2,2) of the block 520 has respective pixel value C(1,1), C(1,2), C(2,1), and C(2,2), and therefore the processor 140 has to initialize pixel values of the pixels with an initial value $C_0$. In which the initial value $C_0$ is the mean pixel value of block 520 expressed by the following equation:

$$C_0 = \frac{(C(1, 1) + C(1, 2) + C(2, 1) + C(2, 2))}{4} \quad (3)$$

In this embodiment, the processor then 140 generates pixel values $C_1$ and $C_2$ by adjusting $C_0$ with color difference $\Delta C$. In which the color difference $\Delta C$ may be chromaticity value, brightness value or a combination thereof. The pixel values $C_1$ and $C_2$ are expressed by the following equation:

$$C_1 = C_0 + \Delta C \quad (4)$$

$$C_2 = C_0 - \Delta C \quad (5)$$

Insufficient color difference $\Delta C$ between the pixel values $C_1$ and $C_2$ causes camera difficulty distinguish one color from another, and results in failure of data decoding. In an embodiment, the processor 140 calculates chromaticity contrast or brightness contrast between the pixel values $C_1$ and $C_2$. If the chromaticity contrast or the brightness contrast between the pixel values $C_1$ and $C_2$ is less than a threshold value T, the color difference $\Delta C$ should be redesigned.

Lastly, the processor 140 adjusts pixel value of the encoded area according to the encoded data bitstream. For example, the processor 140 assigns pixel value $C_1$ to first diagonal pixels 520(1,1) and 520(2,2) and assigns pixel value $C_2$ to second diagonal pixels 520(1,2) and 520(2,1) as the corresponding code of encoded data is 1. Conversely, the processor 140 assigns pixel value $C_2$ to the first diagonal pixels 520(1,1) and 520(2,2) and assigns pixel value $C_1$ to the second diagonal pixels 520(1,2) and 520(2,1) as the corresponding code of encoded data is 0.

For example, the processor 140 initializes pixels 520(1,1), 520(1,2), 520(2,1), and 520 (2,2) with initial value $C_0=(192,$ 192, 0), and generates $C_1=(224, 224, 0)$ and $C_2=(160, 160, 0)$. The processor 140 adjusts the pixel value of first diagonal pixels to $C_1=(224, 224, 0)$ and adjusts the pixel value of second diagonal pixels to $C_2=(160, 160, 0)$ as the code of the encoded data is 1. The processor 140 adjusts the pixel value of first diagonal pixels to $C_2=(160, 160, 0)$ and adjusts the pixel value of second diagonals pixel to $C_1=(224, 224, 0)$ as the code of the encoded data is 0.

The process of adjusting pixel value of the encoded area is exemplary, users may adjust tone or brightness for data storage.

As two colors are arranged in crisscross, such as 520(1,1), 520(1,2), 520(2,1) and 520(2,2), people see mixture of color at a distance because human vision blurs viewing area. Therefore, users may not perceive particular color arrangement in encoded image at a distance, and he/she can shoot encoded image to decode hidden data at close distance.

Figure 6:
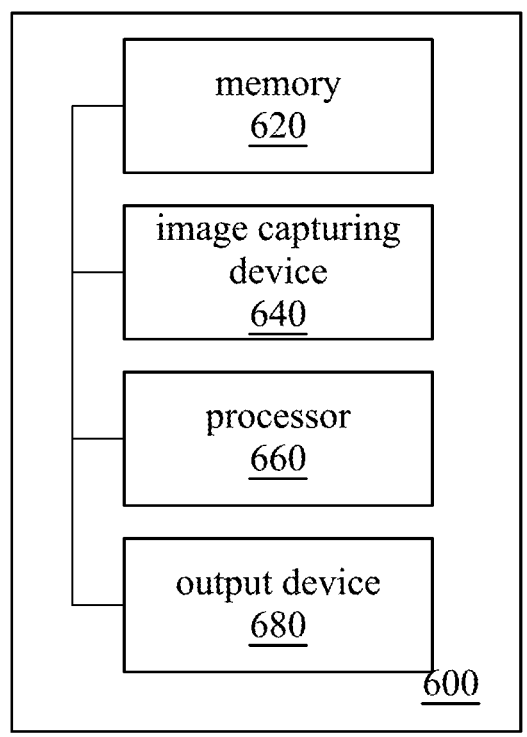
FIG. 6 is a block diagram of a device for picture-based barcode decoding according to an embodiment of the present disclosure.

Reference is made to FIG. 6. FIG. 6 is a block diagram of a device 600 for picture-based barcode decoding according to an embodiment of the present disclosure. The device 600 includes a memory 620, an image capturing device 640, a processor 660 and an output device 680. The memory 620 includes a log manager, a log buffer, or a log repository for storing the data of the picture-based barcode decoding device 600.

In an embodiment, the memory 620 is for storing data, such as captured image, transformed image, decoded data, original data bitstream and original data, but not limited thereto.

The image capturing device 640 may be a camera. The processor 660 may be implemented with an independent microprocessor or one or more CPUs. The output device 680 may be a screen, a speaker or a combination thereof. Detailed description of the device 600 is discussed in detail below.

Figure 7:
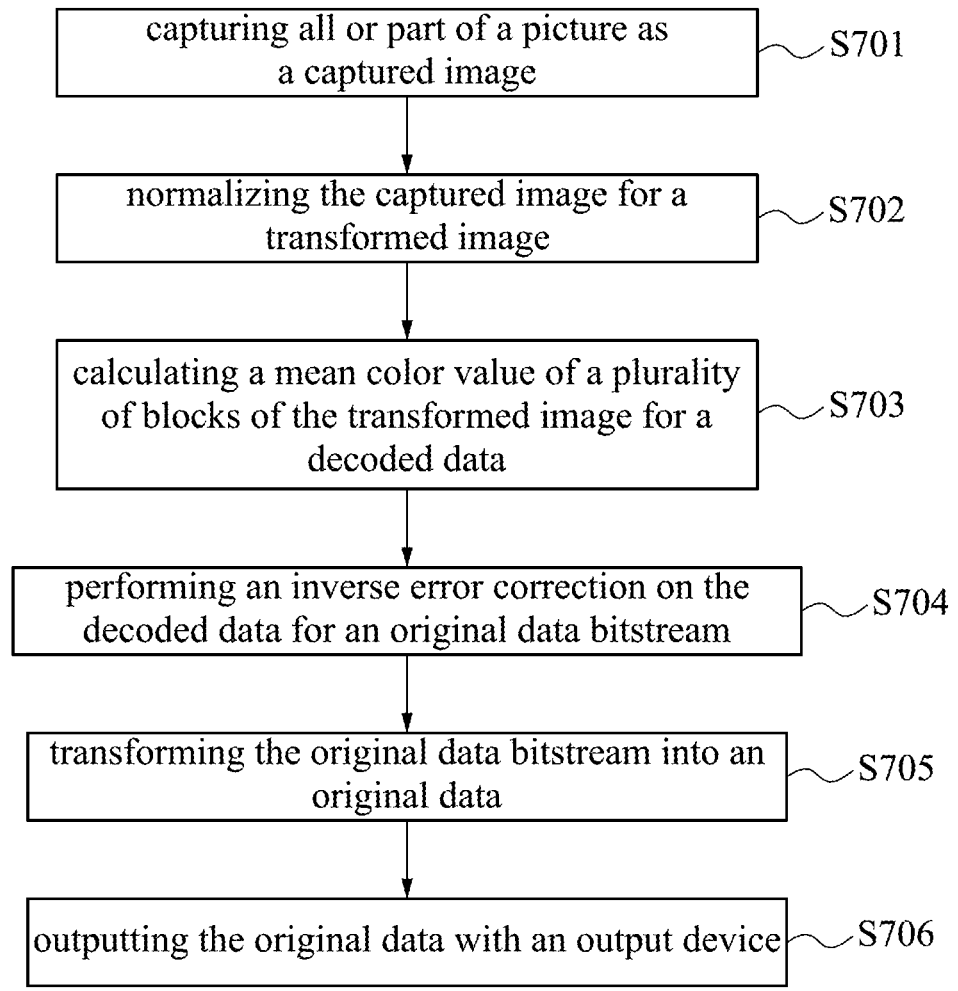
FIG. 7 is a flow chart of a method for picture-based barcode decoding according to an embodiment of the present disclosure.

Reference is made to FIG. 7. FIG. 7 is a flow chart of a method for picture-based barcode decoding according to an embodiment of the present disclosure. The method for picture-based barcode decoding may be implemented by the device 600, but is not limited in this regard. For convenience and clarity, it is assumed that the method for picture-based barcode decoding is implemented by the device 600 illustrated in FIG. 6.

In step S701, the image capturing device 640 captures all or part of a picture as a captured image according to a positioning symbol of the picture and stores the captured image in the memory 620. In various embodiments, the positioning symbol may be implemented with a plurality of points, a plurality of lines or a profile. The technique of image capturing by image capturing device according to the positioning symbol is apparent to those of ordinary skill in the art and thus will not be explained in detail here.

Figure 8:
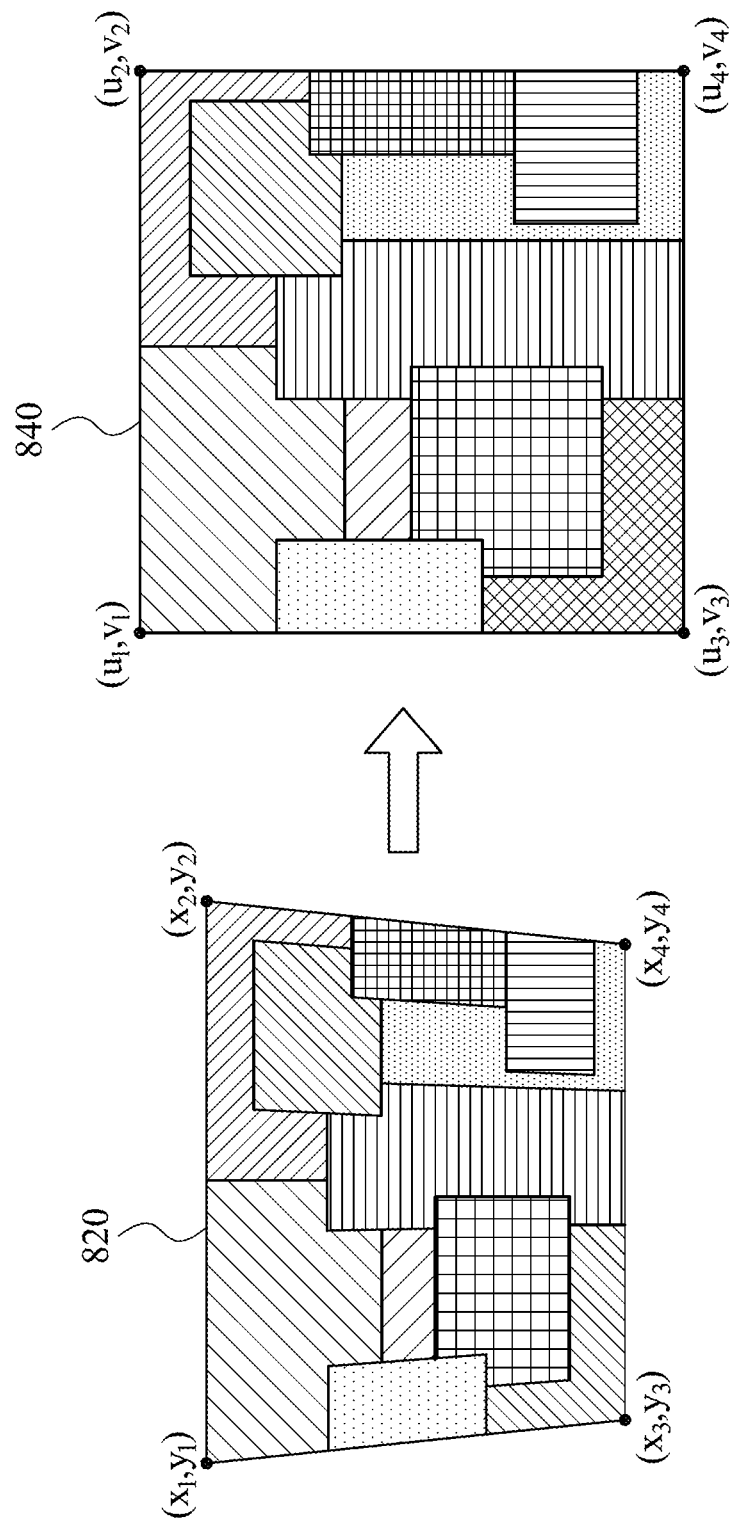
FIG. 8 is a diagram depicting a process for image normalization according to an embodiment of the present disclosure.

In step S702, the processor 660 normalizes the captured image for generating a transformed image. For convenience and clarity, reference is made to FIG. 8. FIG. 8 is a diagram depicting a process of image normalization according to an embodiment of the present disclosure. When user utilizes the image capturing device 640 to capture an image as a captured image 820, the captured image 820 may be distorted. Therefore, it is necessary to transform the captured image 820 into a transformed image 840 with a normalization process.

In an embodiment, let $(x_i, y_i)$ and $(u_i, v_i)$ be, respectively, the corner coordinates of the captured image 820 and the transformed image 840. The perspective projection matrix is represented as, $$\begin{bmatrix} x'_i \\ y'_i \\ z \end{bmatrix} = \begin{bmatrix} a & b & c \\ d & e & f \\ g & h & 1 \end{bmatrix} \begin{bmatrix} u_i \\ v_i \\ 1 \end{bmatrix} \quad (6)$$

In which $(x_i', y_i')$ represents the scaled coordinate. The coordinates of eight corners are employed to estimate eight unknown parameters in (6). Finally, the coordinate $(x_i, y_i)$ is calculated by, $$x_i = \frac{x'_i}{z} = \frac{au_i + bv_i + c}{gu_i + hv_i + 1} \quad (7)$$

$$y_i = \frac{y'_i}{z} = \frac{du_i + ev_i + f}{gu_i + hv_i + 1} \quad (8)$$

In this embodiment, the processor 660 obtains variables a~h with further calculation and transforms the distorted captured image 820 into a decodable transformed image 840. The algorithm about matrix calculation is apparent to those of ordinary skill in the art and thus will not be explained in detail here.

The method for image normalization is exemplary, the invention is not limited to the foregoing embodiments.

Figure 9:
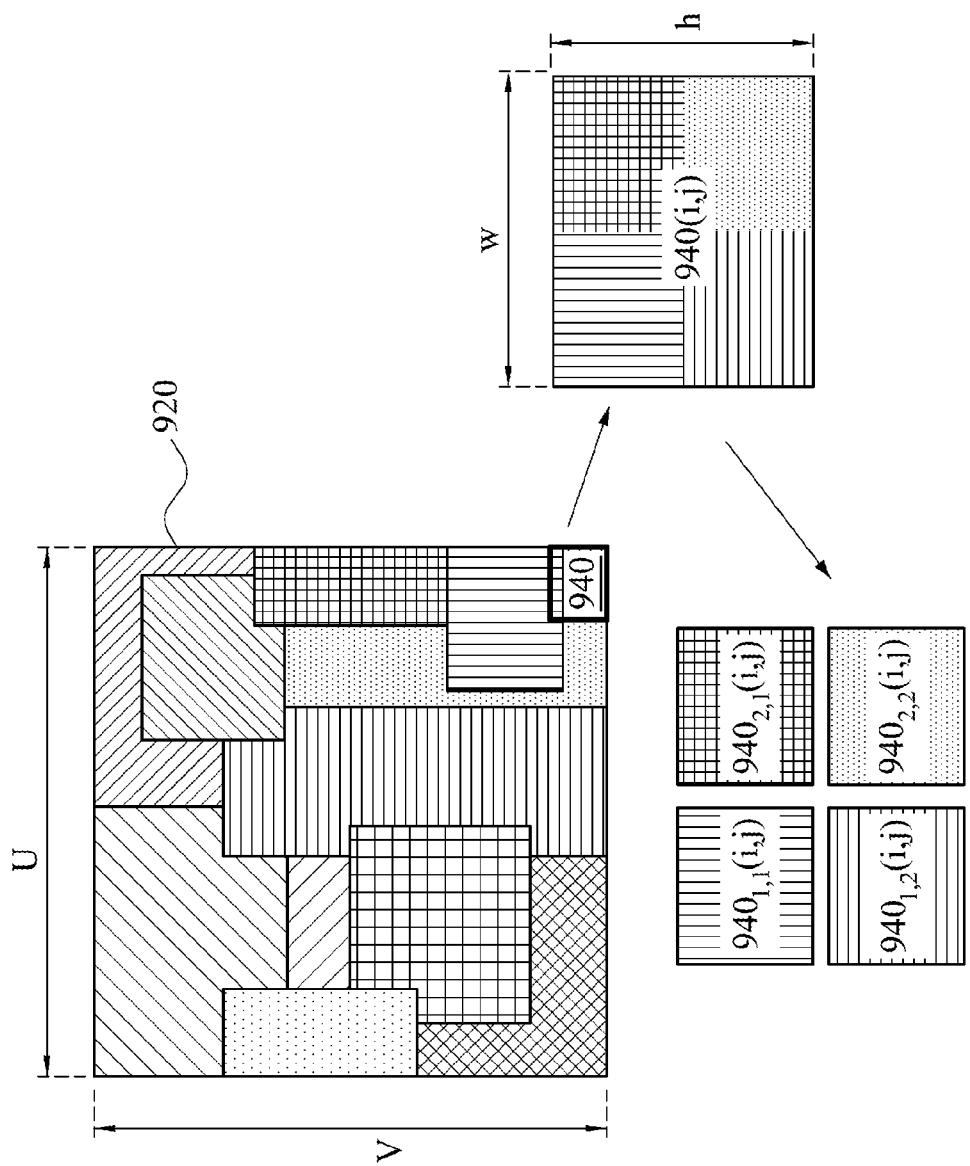
FIG. 9 is a diagram depicting a process for image decoding according to an embodiment of the present disclosure.

In step S703, the processor 660 calculates the mean color value of a plurality of blocks of the transformed image 840 for obtaining a decoded data. For convenience and clarity, reference is made to FIG. 9. FIG. 9 is a diagram depicting a process for image decoding according to an embodiment of the present disclosure.

In an embodiment, the processor 660 divides transformed image 920 into $N_w \times N_h$ blocks 940$(i,j)$ which corresponds to the $(i,j)$-th decoded data $\Phi(i,j)$. In various embodiments, the processor 660 divides the transformed image 920 according to the size of the encoded data or the size of the positioning symbol. In which U and V respectively represent the width and the height of the transformed image 920. In this embodiment, w and h respectively represent the width and the height of the block 940$(i,j)$. Therefore, $N_w$ and $N_h$ are expressed by the following equations:

$$N_w = \lfloor U/w \rfloor \quad (9)$$

$$N_h = \lfloor V/h \rfloor \quad (10)$$

The invention is not limited to the foregoing embodiments, the manner for dividing the transformed image 920 is adjusted based on design requirement.

The processor 660 then divides the block 940$(i,j)$ into four sub-blocks 940$_{1,1}(i,j)$, 940$_{1,2}(i,j)$, 940$_{2,1}(i,j)$, and 940$_{2,2}(i,j)$. The mean color value of the sub-blocks 940$_{1,1}(i,j)$, 940$_{1,2}(i,j)$, 940$_{2,1}(i,j)$, and 940$_{2,2}(i,j)$ are $C_{1,1}(i,j)$, $C_{1,2}(i,j)$, $C_{2,1}(i,j)$, and $C_{2,2}(i,j)$.

For example, when the sum of mean color values ($C_{1,1}(i,j) + C_{2,2}(i,j)$) of the first diagonal sub-blocks 940$_{1,1}(i,j)$ and 940$_{2,2}(i,j)$ is larger than the sum of mean color values ($C_{1,2}(i,j) + C_{2,1}(i,j)$) of the second diagonal sub-blocks 940$_{1,2}(i,j)$ and 940$_{2,1}(i,j)$, the encoded data $\Phi(i,j)$ is 1. Conversely, when the sum of mean color values ($C_{1,1}(i,j) + C_{2,2}(i,j)$) of the first diagonal sub-blocks 940$_{1,1}(i,j)$ and 940$_{2,2}(i,j)$ is smaller than the sum of mean color values ($C_{1,2}(i,j) + C_{2,1}(i,j)$) of the second diagonal sub-blocks 940$_{1,2}(i,j)$ and 940$_{2,1}(i,j)$, the encoded data $\Phi(i,j)$ is 0.

In this embodiment, the determination of the $(i,j)$-th encoded data $\Phi(i,j)$ is given by, $$\Phi(i,j) = \begin{cases} 1, & \text{if } \|C_{1,1}(i,j)\| + \|C_{2,2}(i,j)\| > \\ & \|C_{1,2}(i,j)\| + \|C_{2,1}(i,j)\| \\ 0, & \text{othereise} \end{cases} \quad (11)$$

Figure 10:
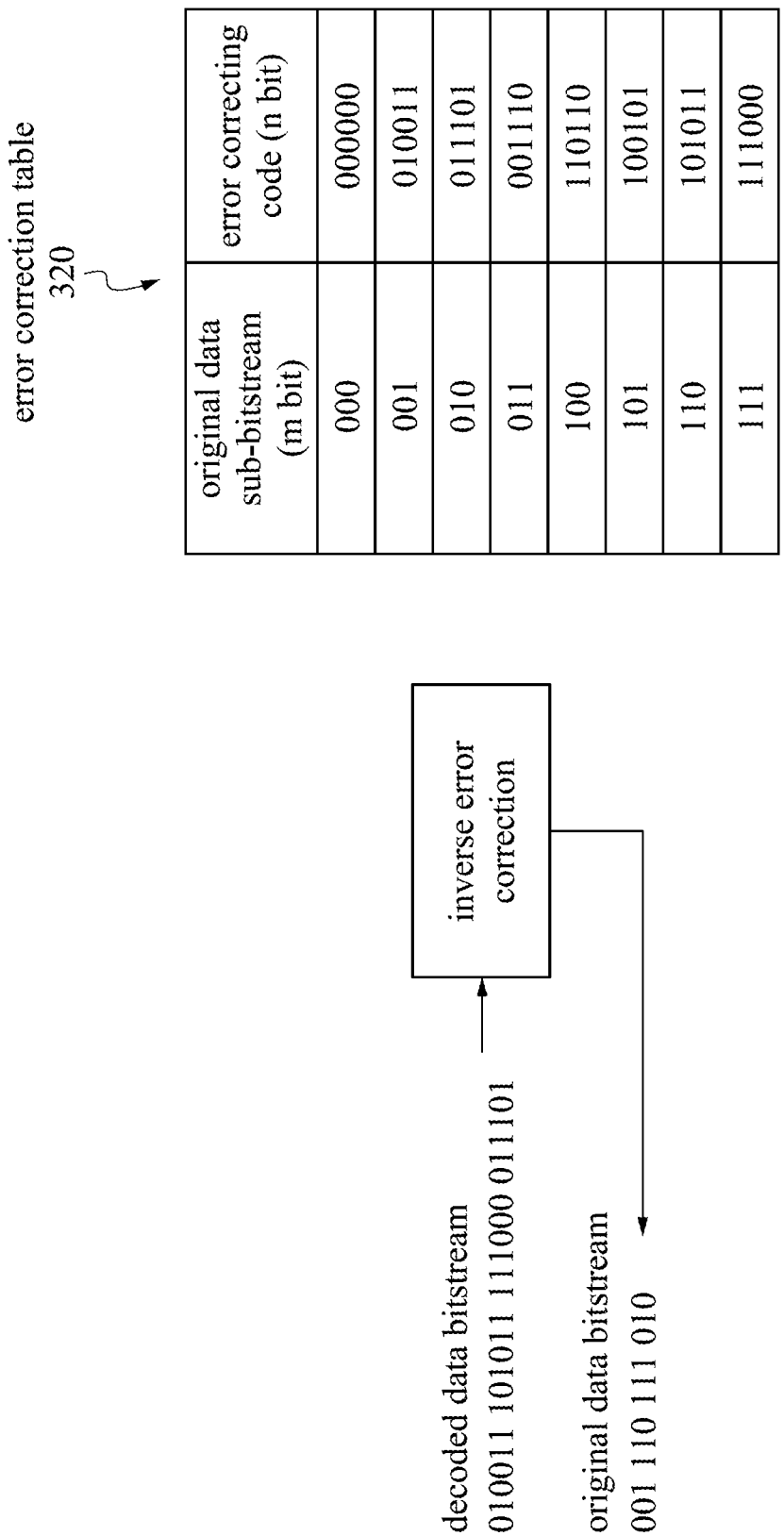
FIG. 10 is a diagram depicting a process for inverse error correction according to an embodiment of the present disclosure.

In step S704, the processor 660 performs an inverse error correction on the decoded data for generating an original data bit stream. For convenience and clarity, reference is made to FIG. 10. FIG. 10 is a diagram depicting a process for inverse error correction according to an embodiment of the present disclosure. In this embodiment, the processor 660 transforms the decoded data into decoded data bitstream, divides the decoded data bitstream into a plurality of decoded data sub-bitstream, and compares the decoded data sub-bitstream with error correcting code in an error correction table 320 for finding the most similar error correcting code. In which the decoded data is organized in the form of an $N_w \times N_h$ two-dimensional matrix, and the decoded data bitstream is organized in the form of an $N_w \times N_h$ one-dimensional code.

In one embodiment, the process of finding the most similar error correcting code is expressed by the following equation:

$$j^* = \arg\max\nolimits_{j=\{1,2,\ldots,2^m\}} |SIM(s_{DEC}, s_{ECC}(j))| \quad (12)$$

In which SIM(a,b) represents similarity between bitstreams a and b, $s_{DEC}$ represents n-bits in the decoded data, and $s_{ECC}(j)$ represents the j-th error correcting code.

Inverse error correction is apparent to those of ordinary skill in the art and thus will not be explained in detail here.

In this embodiment, the processor 660 further garners the corresponding original data sub-bitstream according to the error correction table 320 for composing an original data bitstream.

The method of inverse error correction is exemplary, the invention is not limited to the foregoing embodiments.

In step S705, the processor 660 transforms the original data bitstream into original data. In various embodiments, the original data may be different kinds of format. In this embodiment, the original data contains ASCII characters. Therefore, the processor 660 further divides the original data bitstream into a plurality of 8-bit data for transforming the original data bitstream into the original data contained ASCII characters. In this embodiment, the processor 660 ceases transforming the original data bitstream when gibberish appears or when the length of remaining original data bitstream is less than 8.

In step S706, the processor 660 outputs the original data with an output device. For example, the processor 660 outputs original data over speaker when the original data is an audio data, and displays original data over screen when the original data is an image data.

According to the technique of the present disclosure, data may be stored in picture without extra space for placing barcode. Therefore, users may access data stored in the picture by scanning the picture with a mobile device, but not receives information of pictures through the internet. In addition, error correction capability and storage capacity of barcode are efficiently enhanced.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims.

What is claimed is:

1. A method for picture-based barcode encoding, comprising:
   transforming an original data into an original data bitstream;
   performing an error correction on the original data bitstream for translating the original data bitstream into an error corrected bitstream;
   selecting all or part of the picture as an encoded area;
   calculating a data storage capacity of the encoded area;
   adjusting a size of the error corrected bitstream or a size of the encoded area for equalizing a data storage capacity of an encoded data bitstream and the data storage capacity of the encoded area; and
   adjusting a pixel value of the encoded area according to the encoded data bitstream.

2. The method of claim 1, wherein the step of performing the error correction on the original data bitstream for translating the original data bitstream into the error corrected bitstream comprises:
   translating every m-bits of the original data bitstream into n-bits error corrected code according to an error correction table.

3. The method of claim 1, wherein the step of adjusting the size of the error corrected bitstream or the size of the encoded area for equalizing the data storage capacity of the encoded data bitstream and the data storage capacity of the encoded area comprises:
   assigning the error corrected bitstream to the encoded data bitstream when the size of the error corrected bitstream is larger than the data storage capacity of the encoded area; and
   re-choosing the encoded area or enlarging the picture for meeting the size of the encoded data bitstream;
   performing a zero-padding on the error corrected bitstream for generating the encoded data bitstream when the size of the error corrected bitstream is smaller than the data storage capacity of the encoded area,
   wherein the size of the encoded data bitstream is equal to the data storage capacity of encoded area.

4. The method of claim 1, wherein the step of adjusting the pixel value of the encoded area according to the encoded data bitstream comprises:
   dividing each block of the encoded area into 4 pixels;
   initializing a plurality of pixel values of the pixels with an initial value;
   adjusting a plurality of pixel values of a plurality of first diagonal pixels and a plurality of pixel values of a plurality of second diagonal pixels of the corresponding block according to a bit value of the encoded data bitstream.

5. The method of claim 4, wherein the step of adjusting the pixel values of the first diagonal pixels and the pixel values of the second diagonal pixels of the corresponding block according to the bit value of the encoded data bitstream comprises:
   adjusting the pixel values of the first diagonal pixels to a first pixel value and adjusting the pixel values of the second diagonal pixels to a second pixel value when the bit value of the encoded data bitstream is a first bit value; and
   adjusting the pixel values of the first diagonal pixels to the second pixel value and the pixel values of the second diagonal pixels to the first pixel value when the bit value of the encoded data bitstream is a second bit value.

6. The method of claim 5, where in a brightness contrast or a chromaticity contrast between the first pixel value and the second pixel value is greater than a threshold value.

7. A device for picture-based barcode encoding, comprising:
   a memory for storing an original data, an original data bitstream, an error corrected bitstream, a storage data of an encoded area, an encoded data bitstream and a picture;
   a processor for executing the following steps:
      transforming the original data into the original data bitstream;
      performing an error correction on the original data bitstream for translating the original data bitstream into the error corrected bitstream;
      selecting all or part of the picture as the encoded area;
      calculating a data storage capacity of the encoded area;
      adjusting a size of the error corrected bitstream or a size of the encoded area for equalizing a storage capacity of the encoded data bitstream and a data storage capacity of the encoded area; and
      adjusting a pixel value of the encoded area according to the encoded data bitstream.

8. The device of claim 7, wherein an error correction table is stored in the memory, wherein the processor translates every m-bits of the original data bitstream into n-bits error corrected code according to the error correction table.

9. The device of claim 7, wherein step of adjusting the size of the error corrected bitstream or the size of the encoded area for equalizing the storage capacity of the encoded data bitstream and the data storage capacity of the encoded area comprises:
   assigning the error corrected bitstream to the encoded data bitstream when the size of the error corrected bitstream is larger than the data storage capacity of the encoded area; and
   re-choosing the encoded area or enlarging the picture for meeting the size of the encoded data bitstream;
   performing a zero-padding on the error corrected bitstream for generating the encoded data bitstream when the size of the error corrected bitstream is smaller than the data storage capacity of the encoded area,
   wherein the size of the encoded data bitstream is equal to the data storage capacity of encoded area.

10. The device of claim 7, wherein the step of adjusting the pixel value of the encoded area according to the encoded data bitstream comprises:
    dividing each block of the encoded area into 4 pixels;
    initializing a plurality of pixel values of the pixels with an initial value;
    adjusting a plurality of pixel values of a plurality of first diagonal pixels and a plurality of pixel values of a plurality of second diagonal pixels of the corresponding block according to a bit value of the encoded data bitstream.

11. The device of claim 10, wherein the step of adjusting the pixel values of the first diagonal pixels and the pixel values of the second diagonal pixels of the corresponding block according to the bit value of the encoded data bitstream comprises:
    adjusting the pixel values of the first diagonal pixels to a first pixel value and adjusting the pixel values of the second diagonal pixels to a second pixel value when the bit value of the encoded data bitstream is a first bit value; and adjusting the pixel values of the first diagonal pixels to the second pixel value and the pixel values of the second diagonal pixels to the first pixel value when the bit value of the encoded data bitstream is a second bit value.

12. The device of claim 11, where in a brightness contrast or a chromaticity contrast between the first pixel value and the second pixel value is greater than a threshold value.

* * * * *